United States Patent [19]
Coulier et al.

[11] Patent Number: 5,963,980
[45] Date of Patent: Oct. 5, 1999

[54] MICROPROCESSOR-BASED MEMORY CARD THAT LIMITS MEMORY ACCESSES BY APPLICATION PROGRAMS AND METHOD OF OPERATION

[75] Inventors: Charles Coulier, Roquevaire; Edouard Gordons, Aubagne; Georges Grimonprez, Villeneuve-d'Ascq, all of France

[73] Assignee: Gemplus Card International, Gemenos, France

[21] Appl. No.: 08/663,166

[22] PCT Filed: Dec. 6, 1994

[86] PCT No.: PCT/FR94/01420

§ 371 Date: Jul. 29, 1996

§ 102(e) Date: Jul. 29, 1996

[87] PCT Pub. No.: WO95/16246

PCT Pub. Date: Jun. 15, 1995

[30] Foreign Application Priority Data

Dec. 7, 1993 [FR] France ................................. 93/14668

[51] Int. Cl.⁶ ..................... G06F 12/14; G06K 19/073
[52] U.S. Cl. .................... 711/163; 235/380; 235/382; 902/26; 713/200
[58] Field of Search ................ 326/8; 711/152, 711/155, 163, 164; 395/186; 713/200; 235/380, 382; 902/26

[56] References Cited

U.S. PATENT DOCUMENTS

| | | | |
|---|---|---|---|
| 4,734,568 | 3/1988 | Watanabe | 235/487 |
| 4,816,654 | 3/1989 | Anderl et al. | 235/380 |
| 4,868,376 | 9/1989 | Lessin et al. | 235/492 |
| 5,452,431 | 9/1995 | Bournas | 395/442 |
| 5,517,014 | 5/1996 | Iijima | 235/492 |
| 5,530,885 | 6/1996 | Kagohata | 364/400 |
| 5,542,081 | 7/1996 | Geronimi | 395/800 |
| 5,600,818 | 2/1997 | Weikmann | 395/490 |
| 5,729,717 | 3/1998 | Tamada et al. | 711/164 |

FOREIGN PATENT DOCUMENTS

| | | |
|---|---|---|
| A-0 540 095 | 5/1993 | European Pat. Off. |
| A-2 612 316 | 9/1988 | France . |
| 2667171 | 3/1992 | France . |

OTHER PUBLICATIONS

Korth et al., Database System Concepts, McGraw–Hill, Inc. pp. 525–533, 1991.

Gosling, J.; McGilton, H. "The Java(TM) Language Environment." Sun Microsystems Inc. [Online] Available: http://java.sun.com/docs/white/index.html, May 1996.

Lawton, G. "Appliances brew Java with Kona (JavaOS)." Javaworld [Online]. Available: http://www.javaworld.com/jw–Jul. 1996/jw–07–appliances–lawton.html.

(List continued on next page.)

*Primary Examiner*—Eddie P. Chan
*Assistant Examiner*—Yamir Encarnacion
*Attorney, Agent, or Firm*—Nilles & Nilles SC

[57] ABSTRACT

Microprocessor-based cards use application programs contained in a non-volatile user memory (MU), under the control of an operating system in a read-only memory (MSYS). To provide flexibility and security of access to the various memory zones without using a specific rigidly fixed circuitry, it is proposed that the memory access instructions of the application programs (PG1, PG2, PG3) should be interpreted and not performed directly. The interpreter is in the read-only memory (MSYS) or in the user memory and it carries out an access instruction as follows: it explores a reserved zone (ZR) of the user memory to find out if the requested access (access for reading, writing or performance) is cleared for the requested address. It performs the instruction only if the clearance is present. The reserved zone (ZR) which contains these clearances is updated during the writing, in the user memory, of a new application program. The updating can be done only by the operating system.

17 Claims, 2 Drawing Sheets

OTHER PUBLICATIONS

"Mitsubishi First To Add Java To Chip." Newsbytes, May 30, 1996.

Skeet, J. "Re: Java on a microcontroller?" [Online] Available: news://comp.lang.java, Apr. 26,1996.

"Oak Language Specification" [Online] Avalable: http://www.java.sun.com/people/jag/green/OakSpec0.2.ps, 1994.

Green, R. "Re: Future impact of Java on HTML." [Online] Available: news://comp.lang.java, Jun. 12, 1996.

Thompson, B. "Re: Design of future silicon to handle Java JVM." [Online] Available: news//comp.lang.java, Jun. 14, 1996.

Gibson, D. "Re: Java on a microcontroller?" [Online] Available: news//comp.lang.java, Apr. 11, 1996.

Nguyen, E. "Java™–BasedBasedDevices Devicesfrom from Mitsubishi" [Online] Avalable: http://www.java.sun.com/javaone/javaone96/pres/index.html, May 1996.

Cordonnier, V.M. "Smart cards: present and future applications and techniques" Electronics & Communication Engineering Journal: 207–212, Oct. 1991.

Betz, D. "Embedded Languages" BYTE : 409–417, Nov. 1988.

Chung et al. "A "Tiny" Pascal Compiler; Part 1: The P–Code interpreter,"BYTE : 58, Sep. 1978.

Chung et al. "A "Tiny" Pascal Compiler; Part 2; The P–Compiler," BYTE : 34, Oct. 1978.

Chung et al. "A "Tiny" Pascal Compiler; Part 3: P–Code to 8080 Conversion," BYTE : 182, Nov. 1978.

Gordons et al, "Portable Microcircuit support that is easily programmable and process for programming this microcircuit", Translation of document 2,667,171 A, Dec. 1998.

|  | SYS + INTERPRETER | PG1 | PG2 | PG3 |
|---|---|---|---|---|
| MSYS (ROM) | X/MSYS | X/Z5 | X/Z5 | X/Z5 |
| MU (EEPROM) | L,E/MU | L,E/Z3 | L,E/Z4 | — |
| MT (RAM) | L,E/MT | L,E/Z1 | L,E/Z2 | L,E/Z2 |

FIG. 3

MICROPROCESSOR-BASED MEMORY CARD THAT LIMITS MEMORY ACCESSES BY APPLICATION PROGRAMS AND METHOD OF OPERATION

BACKGROUND OF THE INVENTION

1. Field of the Invention

The invention pertains to portable integrated circuit cards, also known as chip cards. More particularly, it pertains to cards that have both a memory and a microprocessor to perform application programs contained in the memory. For example, an application program may be a monetary transaction program for a card designed for a banking application.

2. Description of the Prior Art

The general architecture of an integrated circuit chip contained in the card is most usually of the type shown in FIG. 1. The microprocessor is designated by the reference CPU and it is connected to a linking bus, which is furthermore connected to the memories of the card. These memories may be of different types and, most usually, memories of different types are present simultaneously in the integrated circuit. In particular, there may be a read-only memory (ROM) referenced MSYS to contain in particular the fixed programs constituting the general operating systems of the card, a non-volatile memory MU, an electrically programmable memory (EPROM) and possibly an electrically erasable programmable memory (EEPROM) to contain for example application programs and data elements to be kept from one session of use to another, and finally a volatile working memory (RAM) referenced MT containing data elements and portions of programs that are useful during the performance (i.e., execution) of the application programs but are not kept when the card is not used. (Herein, the terms "perform" and "execute" are used interchangeably.)

The integrated circuit also has a communications circuit COM for communications (generally serial communications) between the microprocessor and an input/output terminal I/O of the integrated circuit with a view to exchanges with the exterior of the chip card. The other terminals of the integrated circuit may, in a standard way, be supply terminals (VCC, GND), a clock terminal (CLK), a reset terminal (RST), etc. The functions of the terminals present depend on the communications protocols used.

The general architecture of the integrated circuit may also comprise safety devices DS.

The different memories may, under certain conditions indicated here below, be accessible through the microprocessor CPU to perform the following operations:

the reading of the contents of a determined address, writing at a determined address, the performance, by the microprocessor of the card, of an instruction contained at a determined address.

The read-only memory MSYS may be called a system memory in view of the basic operation programs that it contains. These are programs that all the application programs must make use of so that the card may function. This is the central software core of the card. It is fixed and this is why it is made by means of a non-modifiable read-only memory technology. The information elements and programs that it contains are of a confidential type (usually, the manufacturer of the chip does not wish the programs of the card operating system to be known). This memory therefore is not at all accessible in write mode and it is desirable that it should not be accessible in read mode either. It is of course accessible for the performance of instructions.

The non-volatile memory MU contains data elements and programs that are modifiable. It may be called a "user memory" because it contains specific data and specific programs of an application that concerns the user. However the data elements that it contains are confidential in varying degrees and this is why it is most usually sought to divide this memory into zones with varying degrees of reserved access: these may be zones that are accessible in write mode but not in read mode or accessible in read mode but not in write mode or again zones that are completely accessible or completely inaccessible. Furthermore, certain zones have to be capable of containing program instructions that can be performed by the microprocessor of the card while other zones should not be capable of containing such instructions.

The working memory MT contains temporary data elements which may result from the performance of the programs of the operating system or of the application programs. As a general rule, all the zones of the working memory are accessible in read mode, write mode or execution.

The different memories of the chip card therefore require access clearance that is different from one memory to another.

To check the different access clearances, certain chip card circuits are fitted out with a "security matrix". This is a protection circuit that controls access to such and such a zone of a memory as a function of the operation requested (reading, writing, performance of an instruction). This circuit receives the address at which the operation has to be performed and gives a signal to permit or prohibit the performance of the operation requested.

As a general rule, this security matrix prohibits access (for a requested operation) throughout the memory considered, but it is possible to conceive of a case where this matrix is more complicated and prohibits or permits the operation for limited zones of the memory considered. This is becoming increasingly true with the expansion of the sizes of user memories.

The advantage of such a device is that it prohibits the reading of an operating system (developed by the manufacturer of the card) by means of an application program that is being performed in the user memory MU (a program developed by a manager of an application: for example a bank in the case of a bank card). Similarly, it is possible to prohibit the reading by the user of programs developed by the manager of the application.

The safety matrix, when it exists, has the drawback of being fixed once and for all. If this were not the case, there would be the risk that the access prohibition that it sets up might be evaded.

It will be noted that there is no zone, in the working memory MT, reserved for the requirements of the operating systems and no zone reserved for the requirements of the application programs: the working memory contains mixed data elements coming from both types of program. This is a drawback for the safety of the data elements of the operating system.

Furthermore, circuits not fitted out with a safety matrix are flimsy against ill-intentioned encroachment. The reading of the contents of the read-only memory (operating system) can be done before the step of the customization of the card with personal application data elements if major precautions have not been taken. For it is enough, at this stage, to place a program in the user memory for the methodical reading of the contents of the read-only memory and for the transfer of these contents out of the circuit.

At present, the operating systems form a set of processing operations that are dedicated to certain applications (for example banking cards or radiotelephone cards) and have the function of facilitating the development as well as the performance of specific application programs. The designers of these application programs (who are increasingly numerous) have increasingly stringent requirements as regards the functions of the card. It is then necessary to develop the desired functions around a fixed operating system. These functions are placed in a user memory. The programs that provide these functions are functional additions to the basic system and must not interfere with the structures of data elements managed by the operating system.

Specific developments in the future will probably require the increasingly greater flexibility of operating systems, a clear distinction between operating systems and application programs and the adaptable and efficient protection of the programs and of the data elements proper to each program.

SUMMARY OF THE INVENTION

In general, the invention is aimed at proposing microprocessor-based memory cards well secured against undesirable attempts to access certain parts of the memory, and high flexibility in the management of this security.

It can furthermore be implemented by means of existing microcircuits without any physical modification of these microcircuits for modifications made in a circuit entail substantial manufacturing costs.

According to the invention, there is proposed a microprocessor-based memory card comprising at least one system read-only memory containing programs of an operating system and a non-volatile user memory containing data elements and programs pertaining to at least one application of the memory card, wherein the read-only memory or the user memory comprises an interpreter program to carry out the memory access instructions of the application programs, wherein for this purpose the instructions for access to any address of one of the memories of the card, these instructions being present in an application program of the user memory, are of a type that can be interpreted and that are not directly performable, and are capable of activating the performance, by the interpreter, of an interpretation subprogram comprising: the examination of a checking zone in the user memory, this zone defining the clearances for access to the different memories, a comparison between the access instruction requested for a specified address and the corresponding clearance given in the checking zone and performance of the access instruction only if the clearance exists for the type of access required and for the address requested.

Certain instructions of the operating system itself could be interpreted by the interpreter program.

In short therefore, a program called an interpreter, preferably in the read-only memory but possibly in the user memory, obligatorily interprets the instructions for access to any memory (system, user, working memory) so that the application program cannot access these addresses without a check performed by the interpreter program.

The result thereof is that the read access to the programs will be very easily protected: the interpreter can easily prohibit the writing, in the checking zone, of clearances for access to system memory zones.

Furthermore, the application programs could themselves protect their operation so that, if several application programs are present, memory zones could be reserved for them so that there is no interference between the different programs, whether it is in read mode or write mode or during performance.

Consequently, the invention also proposes a method of operation of a microprocessor-based memory card to carry out application programs contained in a user memory by using the operating system programs contained in a system read-only memory, wherein any instruction for access to a memory of the card, said instruction being contained in an application program in a user memory, is interpreted by an interpretation subprogram contained in the read-only memory of the system (or possibly in a user memory), this subprogram performing an access check according to the requested instruction, on the basis of the access clearance data elements contained at least partly in a reserved zone of the user memory.

The advantages of the invention include the possibility of enabling a sharing of the memory resources among several memory-resident programs (performed in one and the same session), this sharing being perfectly controlled by the interpreter program.

BRIEF DESCRIPTION OF THE DRAWINGS

Other features and advantages of the invention shall appear from the reading of the following detailed description, made with reference to the appended drawings, of which:

FIG. 3 shows an access clearance table contained in the reserved zone of the user memory.

MORE DETAILED DESCRIPTION

Figure 1:
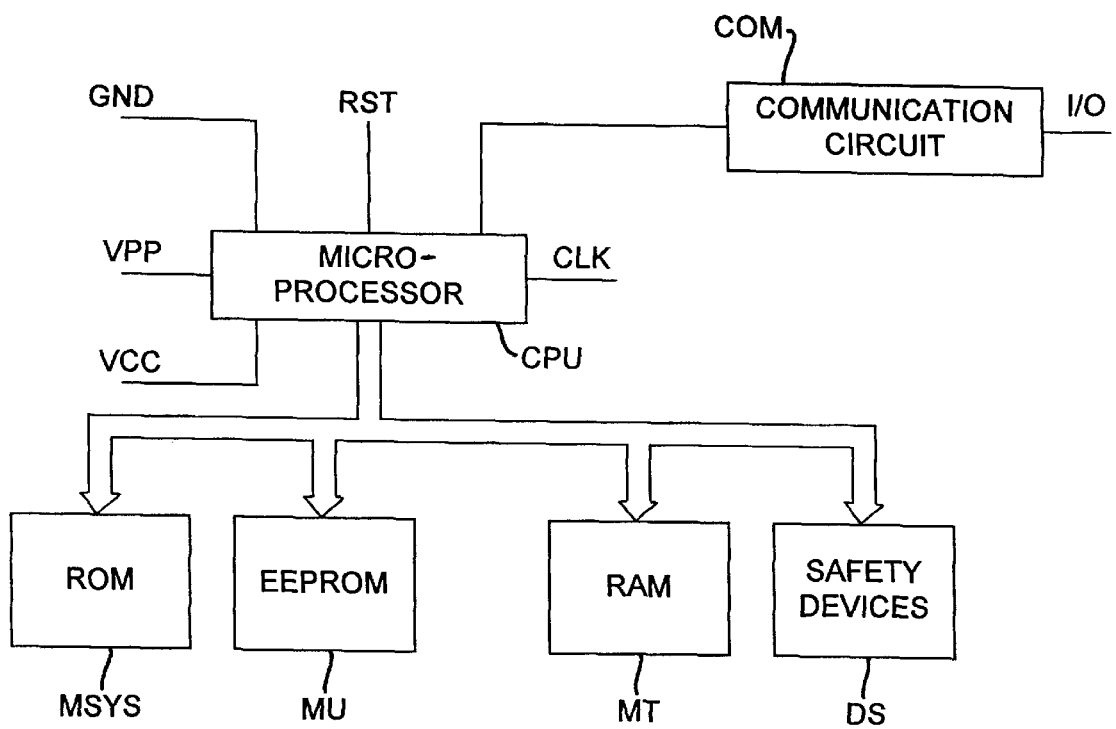
FIG. 1, already described, shows the general structure of an integrated circuit of a microprocessor-based memory card.

The difference between a instruction capable of being performed and an instruction capable of being interpreted may be recalled. The instruction capable of being performed (i.e., executed) is a logic code given to the microprocessor. It directly controls the different circuits and registers of the microprocessor. The instruction capable of being interpreted is an instruction guided by an interpreter program which, just like a processor, reads the current instruction, decodes it and then performs it. The interpreter program can perform these three actions on all instructions in a language that is capable of being interpreted.

According to the invention, it will be seen that the application programs present in the non-volatile user memory are written in a language capable of being interpreted, the interpreter being preferably in the system read-only memory.

The first step in the implementation of the invention consists of the definition, for each user program, of the access zones to be checked. For example, this program will have the possibility of accessing certain memory zones in read mode, certain other memory zones in write mode and then again certain other memory zones in performance mode. Thus, for this program, a sort of "security matrix" is set up. However this matrix is not at all fixed and is not physically present except in the form of a reserved memory zone in the user memory. The contents of this zone are modifiable but the zone is, in principle, at a fixed location.

The user memory will therefore have, firstly, application program zones and, secondly, a reserved access checking zone.

When the application program is loaded into the user memory (with recording in an EPROM or EEPROM type of non-volatile memory), the loading will of course be done by means of the operating system.

A loading program is therefore provided in the operating system. In practice it is a loading and unloading program since it may be necessary also to eliminate old programs that are no longer useful (for example to replace one version of an application by an updated version).

The loading program has the following functions:

the writing of the application program in a user memory zone, and the writing, in the reserved access checking zone, of information elements pertaining to the different access clearances desired during the performance of the loaded application program.

The contents of this access zone depend partly on the loaded application program: depending on the needs of this program, various access clearances may be set up. However, it also depends on the operating system: there is no question of the application program indicating that it needs to read or write in the memory system.

Since the loading program forms part of the read-only memory operating system, it will be understood that this program will itself set up the highest-level prohibitions: absolute prohibition against the reading of the contents of the operating system memory, prohibition against writing in the reserved zone itself except during the progress of the loading or unloading program (this progress being identified by the state of the ordinal counter of the operating system and this state possibly forming one of the constituent elements of access clearance).

The activation of the loading or unloading program is preferably made conditional upon the presenting of a secret entitlement code that gives clearance for its implementation. The code is checked by means of a routine of the operating system in the read-only memory.

The loading program therefore writes the application program in the program zones of the user memory and the access clearances in a reserved zone of this same memory. The unloading program erases the program zones and modifies the contents of the reserved zone.

The reserved zone is preferably a specific location of the user memory, which is always the same location since it is the fixed operating system of the card that must know where it is and what its length is in order to be capable of exploring it during use.

The access clearances installed in this reserved zone may be grouped together as a function of the programs that require access checks. For example, it is possible to encounter the following clearances successively, in the reserved zone: clearances pertaining to the operating system and then those pertaining to a first application program PG1, and then those pertaining to a second application program PG2, etc.

Figure 2:
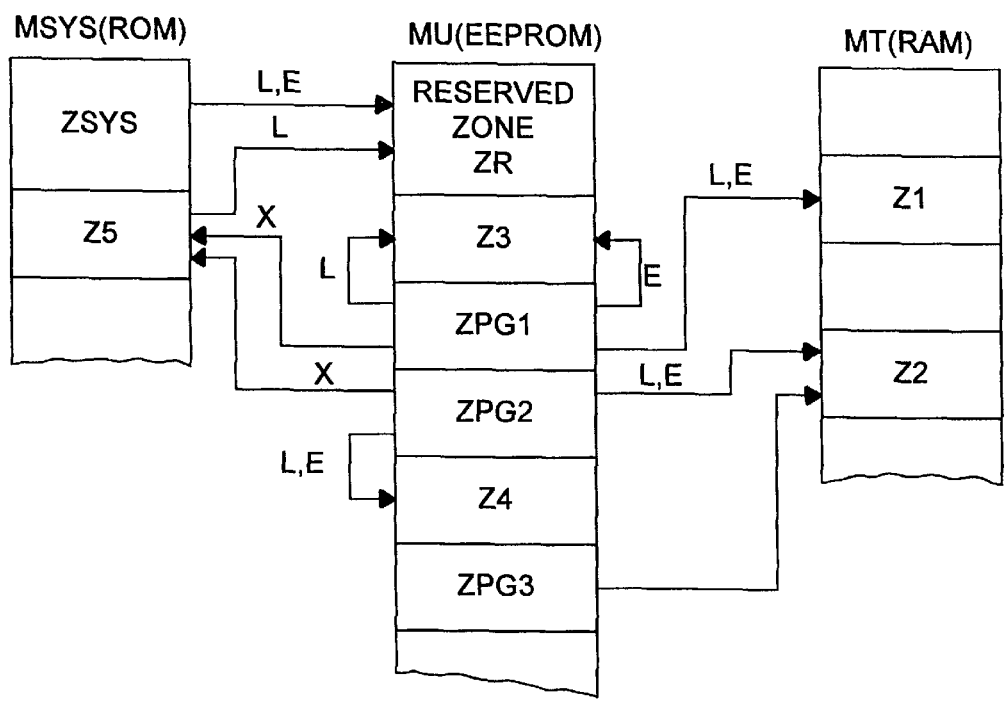
FIG. 2 shows the general organization of the memories in an exemplary implementation of the invention.

FIG. 2 shows the general organization of the memories of the card. By way of examples, this Figure shows various zones such as a zone Z1 and a zone Z2 in the working memory MT. In the user memory MU, there is shown a reserved zone ZR, zones containing application programs ZPG1, ZPG2, ZPG3 and various other zones, for example Z3, Z4. Finally, in the read-only memory (designated by ROM) there is a zone ZSYS for the operating system and other read-only memory zones such as a zone Z5.

FIG. 3 exemplifies the general structure of the reserved zone, in relation to the memory zones defined in the previous figure. The different memories are shown in rows: MSYS for the system read-only memory, MU for the user memory and, MT for the working memory. The various programs concerned are shown in columns: SYS+INTERPRETER for the operating system (including the loading and unloading programs and the programs for the interpretation of the access instructions), PG1 for the first application program, PG2 for the second application program, and PG3 for the third application program. Finally, in the table at the intersection of a row and a column, the cleared access is shown in the following form: (nature of cleared access)/(zones for which access is cleared). The nature of cleared access may be an "L" to designate that an address is readable, an "E" to designate that an address is writable, or an "X" to designate that an address is executable. Of course, combinations of these designations may also be envisioned, for example, the nature of cleared access could be "L, E, X" to indicate that an address is readable, writable and executable. The "zones for which access is cleared" portion of the access clearance indicates one or more zones for which access is cleared (i.e., to the extent indicated by the "nature of cleared access") during the progress of a determined program.

For example, (L,E)/Z3 at the intersection of the row MU and the column PG1 means that, during the performance of the program PG1, the zone Z3 of the user memory is accessible in read and write modes. The indication (L,E)/MU at the intersection of the row MU and the column SYS means that, for the performance of the programs of the system, the entire user memory MU is accessible in read mode and in write mode. It will be understood that the table in this FIG. 3 could be far more detailed and complicated than in the simple example given. For example, the column SYS could be divided into several columns with different forms of access: it could be the case that access in write mode in the reserved zone ZR will be allowed only for the performance of the loading/unloading programs contained in only one part of the ROM.

The program PG1, whose performance is initiated by the system, may for example read and write in the zones Z1 and Z3 of the RAM and of the memory MU respectively and it may directly carry out the instructions contained in the zone Z5 of the ROM. This zone Z5 contains, for example, various routines placed at the disposal of the application programs (communications routines, various algorithms, etc.). Access to these routines is entirely controlled by the access instructions interpreter contained in the ROM, by means of the indications given in the reserved zone ZR.

It will be noted that the access table may work transitively, i.e. if the program PG1 has clearance to perform the program PG2, hence clearance (X) to carry out all the instructions contained in the program zone PG2 under the control of the interpreter then, when carrying out these instructions, it has the same access clearances as the program PG2.

The access instructions interpreter, which forms part of the operating system and uses the contents of the reserved zone, constitutes a software interface between the application programs and the hardware that cannot be evaded. It is therefore possible to achieve total control over all access in reading, writing and performance for all the parts of the memory (ROM, non-volatile memory or volatile memory).

The application programs and above all those of the program instructions which are memory access instructions are prepared in an interpretable language whose instructions are somewhat similar to those of the microprocessor.

At each access instruction in read or write mode, the interpreter takes position in the reserved zone. It scans the values of this zone by checking the validity of access for the instruction being performed and for the program considered. Should there be an attempt at unauthorized access, the interpreter sets up error instructions whose function (error indication, message, locking of operation and elimination of entitlement, etc.) may vary as a function of the seriousness of the attempted infringement.

It may be noted that the interpreter takes account of the indications of indirect branch access to an address possibly implied by the access instruction requested. Furthermore, the interpreter is preferably designed so as to detect any non-performable code. If it finds a non-performable code it may, as a precautionary measure, stop the performance of the program in progress.

The following example will provide for a clearer understanding of the principles of implementation of the invention. It is assumed that the requested access instruction is an instruction for the transfer, towards a pseudo-register R0, of a two-byte word, the first byte of which is indicated in the memory space by another pseudo-register R7. The mnemonic code of this instruction could be for example: MOV.W(R7), R0.

Let us assume that the contents of the register R7 consist of an address 1000. The word to be transferred is therefore the word formed by the combination of the bytes contained at the addresses 1000 and 1001 of the memory. These addresses correspond, for example, to a portion of the user memory but this memory could be the read-only memory or the working memory.

The instruction MOV capable of being interpreted then points towards a routine of the interpreter at a predetermined address of the read-only memory MSYS. This routine is a routine of performable instructions. It starts by exploring the reserved memory zone ZR to ascertain if the access in reading mode to the addresses 1000 and 1001 is permitted for the program being performed. If this is the case, it performs the task by placing the word that has been read in the pseudo-register R0. If not, it interrupts the progress of the instruction. The operations that must follow in the event of an interruption are pre-programmed in the system memory. They may consist of error messages and messages for a return to other routines.

Another example may be given: the requested access instruction is an instruction for the transfer, towards a memory address indicated by a pseudo-register R0, of a two-byte word, the first byte of which is indicated by the pseudo-register R7. The mnemonic code of this instruction could be for example: MOV.W(R7), R0.

If the contents of the register R7 consist of an address 1000, the word to be transferred is again the word formed by the combination of the bytes contained at the addresses 1000 and 1001 of the memory. The interpreter ascertains, as here above, that the access in reading mode is permitted for the addresses 1000 and 1001 for the program performed. However, it also ascertains that the address contained in the register R0 is an address cleared in write mode.

For the efficient operation of the method, it will be understood that it is desirable that the interpreter should at all times know whether it is performing an application program (and in principle it should even know which specific program is being performed) or the loading/unloading program which alone is entitled to carry out a recording in the reserved zone.

The reading of the ordinal counter of the microprocessor should make it possible to determine the program in progress. For example, when the state of the ordinal counter corresponds to the performance of the loading program, all the addresses of the user memory are made accessible, enabling a writing of a program in this memory and a writing of access data elements in the reserved zone ZR.

The reserved zone may contain "applications program loading address" type information elements, namely information elements of the type pertaining to the address of the first instruction of this program. It may also contain a data element on the length (number of instructions) of the program.

Then come the statements pertaining to zones usable by this program in read, write and performance modes. Naturally, the loading program, by means of which the reserved zone will be updated, ascertains that the zones declared to be accessible by the application program do not comprise the reserved zone itself. Failing this, it would still be possible to read or modify the contents of this zone by means of an application program.

During the updating of the reserved zone, it is possible to envisage the checking of the contents of the statements given by the authority (the one that manages the loading of application programs) to prohibit interactions among different application programs.

In this case, it is the interpreter that carries out a complete check of the contents of the reserved zone when it is updated. It is furthermore desirable to get the authority in charge of this to manage the loading of all the application programs.

Finally, it is possible to conceive of a case where the reserved zone also contains indications other than those pertaining to access to one memory space or another. For example, this zone may contain information elements pertaining to hardware type program interruptions. Thus, for example, the program PG1 may be interrupted by the hardware interruptions I1 and I2 but not by other types of interruptions. It will be understood that the flexibility of operation of the application programs will be further increased. It is not obligatory to provide routinely for the same hardware interruptions for all the application programs.

If the interpreter contains low-level program routines, it is possible to conceive of a situation where the reserved zone contains information elements on the routines whose use is permitted and the routines whose use is not permitted.

Naturally, it is possible to fill the reserved zone by specifying the memory zones cleared for one type of access or another or on the contrary by specifying the prohibited zones.

What is claimed is:

1. A microprocessor-based memory card comprising:
    (A) a microprocessor;
    (B) memory including
        (1) a system memory, the system memory containing programs of an operating system, and
        (2) a user memory, the user memory containing
            (a) data elements,
            (b) an application program, the application program pertaining to an application of the memory card, the application program including memory access instructions that are used by the application program to access the memory, the memory access instructions not being directly executable by the microprocessor but rather requiring interpretation, and
            (c) a checking zone, the checking zone defining access clearances for accessing the memory; and
    (C) an interpreter program, the interpreter program implementing a memory access control interface that controls access to the memory by the memory access instructions based on the access clearances stored in the checking zone, the interpreter program being stored in the memory, the interpreter program interpreting the memory access instructions so as to produce executable instructions that are directly executable by the microprocessor, the interpreter program including (1) means for interpreting one of the memory access instructions so as to produce at least one of the executable instructions that is directly executable by the microprocessor, (2) means for examining a checking zone in the user memory to determine an access clearance associated with the memory access instruction, (3) means for comparing (i) an address specified by the memory access instruction and the type of access required to execute the executable instruction with (ii) the access clearance associated with the memory access instruction, and (4) means for accessing the memory in the manner specified by the memory access instruction only if the access clearance exists for the address specified and the type of access required.

2. A memory card according to claim 1, wherein the checking zone contains distinct access clearances for several different zones within the system memory and within the user memory.

3. A memory card according to claim 1, wherein the operating system contains a loading program that loads application programs, the loading program being capable of writing a new application program in the user memory outside the checking zone, and the loading program being capable of writing data elements in the checking zone, the data elements representing access clearances to the different memories associated with memory access instructions of the new application program.

4. A memory card according to claim 1, wherein the access clearance includes clearances for at least one of the members of the following group: reading, writing and executing.

5. A memory card according to claim 1, wherein the access clearance includes a prohibition to write in the checking zone during the performance of an application program present in the user memory.

6. A memory card according to claim 1, wherein the means for interpreting comprises an executable routine (i) that corresponds to the memory access instruction and (ii) that includes a plurality of executable instructions which are executed by the microprocessor to implement the memory access required by the memory access instruction, the plurality of executable instructions being the executable instructions that are produced by the interpretation of the memory access instruction, and wherein the memory access instruction is interpreted by executing the executable routine.

7. A memory card according to claim 6, wherein the means for interpreting, means for examining, means for comparing and means for accessing are all implemented using the executable routine.

8. A method comprising:

(A) providing a microprocessor-based memory card, the memory card having a microprocessor and a memory, the memory including a user memory and a system memory, the user memory having an application program stored therein and the system memory having an operating system stored therein, the application program including memory access instructions that are used by the application program to access the memory, the memory access instructions not being directly executable by the microprocessor but rather requiring interpretation; and (B) executing the application program using the operating system wherein, for each memory access instruction, the executing step includes the step of interpreting the memory access instruction using an interpreter subprogram, the interpreter subprogam implementing a memory access control interface that controls access to the memory by the memory access instructions based on access clearances stored in a checking zone, the interpreter subprogram being contained in the memory, the memory access instruction being interpreted so as to produce an executable instruction that is directly executable by the microprocessor, the interpreting step further including (1) examining the checking zone in the user memory to determine an access clearance associated with the memory access instruction, (2) comparing (i) an address specified by the memory access instruction and the type of access required to execute the executable instruction with (ii) the access clearance associated with the memory access instruction, and (3) accessing the memory in the manner specified by the memory access instruction only if the access clearance exists for the address specified and the type of access required.

9. A method according to claim 8, further comprising the steps of loading an additional application program into the user memory outside the checking zone using a loading program contained in the system memory, and modifying data elements of the checking zone on the basis of the loading program for the inclusion therein of the access clearances pertaining to the additional application program.

10. A method according to claim 9, wherein the loading program is designed to prevent the recording, in the checking zone, of data elements authorizing an operation of writing in the checking zone during the performance of the application programs loaded into the user memory.

11. A method according to claim 8, wherein the interpreter subprogram comprises an executable routine (i) that corresponds to the memory access instruction and (ii) that includes a plurality of executable instructions which are executed by the microprocessor to implement the memory access required by the memory access instruction, the plurality of executable instructions being the executable instructions that are produced by the interpretation of the memory access instruction during the interpreting step; and wherein, during the interpreting step, the memory access instruction is interpreted by executing the executable routine.

12. A method according to claim 11, wherein the accessing step is performed by the executable routine, the executable routine being executed to completion only if the access clearance exists for the address specified and the type of access required.

13. A method according to claim 12, wherein the examining and comparing steps are also performed by the executable routine.

14. A method according to claim 11, wherein the memory access instruction serves as a pointer to an address of the memory at which the executable routine is stored.

15. A method comprising:

(A) providing a microprocessor-based memory card, the memory card having a microprocessor and a memory, the memory including a user memory and a system memory, the user memory having an application program stored therein and the system memory having an operating system stored therein, the application program including memory access instructions that are used by the application program to access the memory, the memory access instructions not being directly executable by the microprocessor but rather requiring interpretation; and (B) executing the application program using the operating system, the executing step including, for each memory access instruction, the step of interpreting the memory access instruction by executing an executable routine (i) that corresponds to the memory access instruction and (ii) that includes a plurality of executable instructions which are executed by the microprocessor to implement the memory access required by the memory access instruction, the memory access instruction serving as a pointer to an address of the memory at which the executable routine is stored, the executable routine comprising a plurality of instructions that are directly executable by the microprocessor, and the interpreting step further including (1) examining a checking zone in the user memory to determine an access clearance associated with the memory access instruction,
   (2) comparing (i) an address specified by the memory access instruction and the type of access required to execute the executable instruction with (ii) the access clearance associated with the memory access instruction, and
   (3) accessing the memory in the manner specified by the memory access instruction only if the access clearance exists for the address specified and the type of access required, and wherein the examining, comparing and accessing steps are all performed by the executable routine; and wherein the interpreting step is performed by an interpreter program that implements a memory access control interface which controls access to the memory by the memory access instructions based on the access clearances stored in the checking zone.

16. A method according to claim 15, further comprising the steps of loading an additional application program into the user memory outside the checking zone using a loading program contained in the system memory, and modifying data elements of the checking zone on the basis of the loading program for the inclusion therein of the access clearances pertaining to the additional application program.

17. A method according to claim 16, wherein the loading program is designed to prevent the recording, in the checking zone, of data elements authorizing an operation of writing in the checking zone during the performance of any application program loaded into the user memory.

* * * * *